March 3, 1959 R. T. PRING 2,875,847
METHOD FOR ADSORBING CONTAMINATING VAPORS FROM GASEOUS MEDIUM
Filed March 21, 1957

INVENTOR.
ROBERT T. PRING

United States Patent Office 2,875,847
Patented Mar. 3, 1959

2,875,847

METHOD FOR ADSORBING CONTAMINATING VAPORS FROM GASEOUS MEDIUM

Robert T. Pring, South Bend, Ind., assignor to Wheelabrator Corporation, Mishawaka, Ind., a corporation of Nebraska Application March 21, 1957, Serial No. 647,690

11 Claims. (Cl. 183—114.2)

This invention relates to the removal of vapors or gases from air or other gaseous medium and it relates more particularly to the removal of organic materials present as a vapor in air or other gaseous medium.

It is an object of this invention to provide a new method and apparatus for processing air and other gaseous materials to remove contaminating vapors or gases when present in low or in high concentrations.

More specifically, it is an object of this invention to provide a method and apparatus for use in the processing of air or other gaseous medium to remove fumes, odors, solvents and other substances, usually organic, and present in vapor or gaseous form in the air. It is a related object to provide a process of the type described in which the removal of such vapors or gases from air or other gaseous medium can be effected efficiently and economically, which can be employed substantially completely to remove the vapor or gaseous medium from the air, even when present in low concentrations, which can be adapted for substantially continuous operation for use of the process and apparatus in connection with reactions that take place in the process industries and in which use can be made of adsorption materials of the type heretofore employed, such as the activated carbonaceous materials, for the removal of the contaminating vapors or gases from air.

These and other objects and advantages of this invention will hereinafter appear and for purposes of illustration, but not of limitation, an embodiment of the invention is shown in the accompanying drawing in which—

Figure 1:
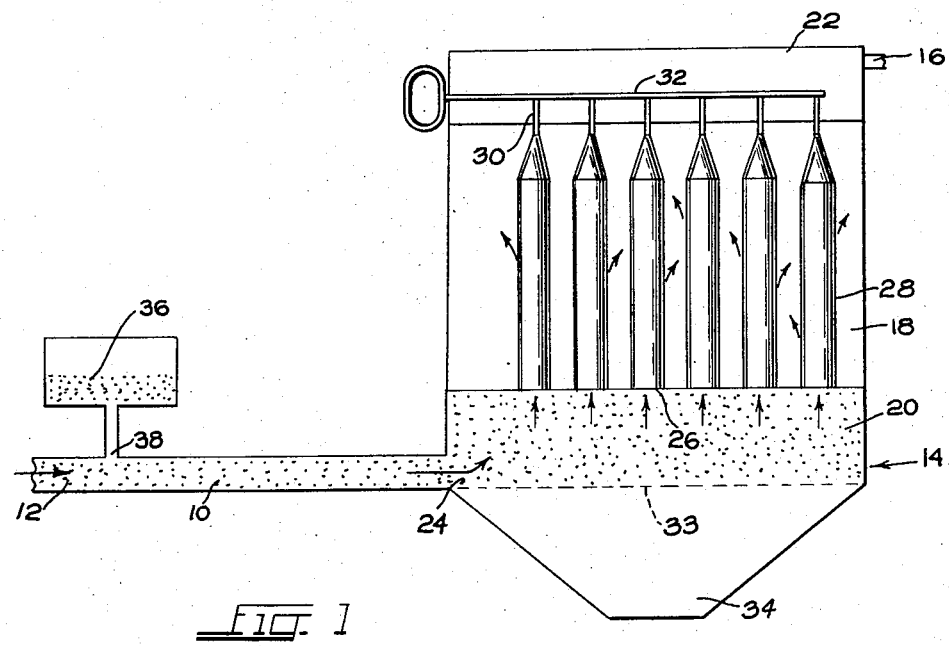
Figure 2:
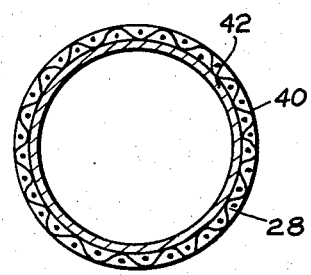

Figure 1 is a schematic pictorial flow diagram of a system which may be employed in the practice of this invention, and Figure 2 is a sectional view through the composite layers through which the contaminated air is filtered.

Activated carbonaceous materials have, in the past, been employed as an adsorbent for the removal of solvents, fumes, noxious odors or the like organic materials in vapor form from air or from other gaseous medium. To the present, such activated carbonaceous materials have been employed as relatively coarse particles packed into relatively thick beds in adsorption towers through which the air or other gaseous material is passed for the treatment of the air to remove the contaminating vapors. Packed columns or towers of the type described have been employed industrially for solvent recovery and they have been employed also for the recovery of various gases or vapors which are released by reactions that take place in the process industries.

Such packed towers or columns are subject to a number of limitations which render them inefficient in many of the applications that are made and which raise a number of problems with respect to their use such that the use of such packed towers or columns is, in many instances, limited.

One of the limitations found to exist in the use of towers packed with reactor beds of activated carbonaceous material resides in the generation of heat which takes place upon the adsorption of the vapors by the activated carbonaceous material. Because of the static character of the reactor beds and because of their relatively good insulating characteristics, dissipation of the heat becomes difficult to the end that temperature rise can take place which often causes reversal of the adsorption action. Reversal is of greater significance when the bed becomes saturated with the adsorbed vapors.

Because of the static character of the packed beds of activated carbonaceous material, when the bed becomes saturated to the extent that it is incapable of efficient removal of the vapors present in the air that is forced through the column, as when the reactor bed reaches the "break through" point, it becomes necessary to take the unit off stream for regeneration of the spent adsorbent. This is a time-consuming and laborious operation which makes it necessary to shut down the tower for a relatively long period of time. Thus it becomes essential in systems wherein packed towers are employed, to provide for a duplicate set of the costly equipment to have one system ready for placement into the treating cycle while the other is being regenerated. Because of the relatively high cost of such packed towers and because of the necessity for duplicate equipment, systems which make use of towers packed with activated carbonaceous material have been found to be somewhat impractical from the standpoint of cost as well as efficiency.

Further, packed adsorption towers of the type heretofore employed have been restricted in their use to the treatment of relatively small quantities of air or other gaseous material. The difficulty which arises in the use of packed columns in the treatment of large quantities of air stems from the large pressure drop that occurs across the packed bed of activated carbonaceous material. The high pressure drop increases the power requirements for forcing the air through the bed and the high pressure drop necessarily limits the quantity of air that can be processed economically through the bed. Thus packed towers have been found impractical in the treatment of the exhausts from many of the reactors employed in the process industries where the vapors or gases might be present in the exhaust in concentrations as low as 75 p. p. m. or even 400 p. p. m.

These same limitations have been found to exist in fluid bed reactors which depend on the entering contaminated gaseous stream to agitate the particles of carbonaceous materials forming the bed whereby the aerated mass has a tendency to behave more as a fluid, but wherein the particles which are merely agitated and aerated remain in place to form a bed. The fluid bed type reactor shares the disadvantages of the static bed of the packed tower, especially from the standpoint of high pressure loss, expensive equipment, and the necessity for duplicate equipment to permit regenerating the carbonaceous material.

Since, in most instances, the atmosphere treated will consist of air contaminated with vapors, the specification and claims will hereinafter refer to air as representative of the gaseous medium. It will be understood, however, that other gases, such as oxygen, nitrogen and the like, may be similarly processed.

It has been found that the contaminating vapors present even in dilute concentrations in air can be efficiently and effectively removed without material pressure drop and without large power requirements when, in accordance with the practice of this invention, a large amount of finely divided activated carbonaceous material or other adsorbent is introduced at the start into the air stream advanced continuously through a filter fabric. The finely divided activated carbonaceous material or other adsorbent becomes uniformly dispersed in the stream of air.

As the air stream filters through the fabric, the finely divided particles of activated carbonaceous material, present as a dispersion in high concentration in the air, is filtered out of the air stream to form a relatively thin, uniform but permeable layer on the ingoing side of the filter fabric. Subsequent portions of the air stream continue then to pass through the porous layer of finely divided carbonaceous material whereby the vapors present in the air are brought into contacting relation with the large amount of surface area available on the activated carbonaceous material in the layer to enable immediate removal of the vapors by adsorption.

An important characteristic which distinguishes the process described over the reactor beds of packed towers and the like systems heretofore employed resides in the relatively large amount of surface area available per unit weight of finely divided adsorbent material present in the porous layer on the ingoing side of the filter surface. As a consequence, more substantial contact is available between the vapors to be removed from the air and the surfaces of the adsorbent material thereby to enable more efficient and effective removal of the vapors from the air by comparison with the coarse particles of activated carbonaceous material packed in adsorption towers. Further, more efficient and complete utilization is made of the adsorbent material available in the porous layer provided on the filter fabric by comparison with the coarse particles employed in reactor beds of packed towers. As a result, the amount of adsorbent material required for removal of an equivalent amount of vapor from air is considerably less in the system described as compared to the static beds heretofore employed in adsorption towers.

It will be apparent further that heat of adsorption, a factor in reactor beds of packed columns, becomes insignificant in a system of the type described because of the inability to generate significant amounts of heat in the thin porous layer of finely divided adsorbent material through which the contaminated air is filtered and because of the dilution as between the amount of adsorbent compared to the large volume of air which is capable of being processed through the porous layer. The air is sufficient to carry away heat of reaction as it is generated and the thin layer of porous adsorbent material is incapable of retaining its heat with the result that a problem of heat generation and reversal, characteristic of packed columns, finds no comparison in the system embodying the practice of this invention.

The system described is sufficiently flexible in its operation to prevent "break through" of the type characteristic of adsorption towers. In the system of the type described, it is possible to introduce additional amounts of finely divided adsorbent material intermittently into the air stream for the purpose of adding to the porous layer of adsorbent material built up on the ingoing side of the filter fabric. In the alternative, removal or reactivation of the activated carbonaceous material forming the porous layer can be easily and quickly effected prior to reaching the break through point as to provide a fresh layer of finely divided adsorbent material with only a momentary lapse in the treating cycle. Either system is effective except that the former has its limitations with respect to the thickness of the porous layer of carbonaceous material which can be built up on the filter surface. The maximum thickness of the layer of particulate adsorbent built up on the surface of the filter fabric corresponds to the thickness at which the pressure drop begins to become noticeable. It is preferable to limit the thickness of the layer to less than ½ inch but greater than ⅛ inch. Periodic additions to build up the layer of adsorbent material on the filter surface is effective because it places the most active and the most adsorbent material at the surface first contacted by the air as it passes through the composite layers where most efficient removal is possible.

Still further, it will be evident that the highly porous, thin layer of finely divided adsorbent material will offer very little resistance to the flow of air through the composite layers, especially when compared to the resistance to flow of equivalent amounts of air through the beds of packed columns. As a result, considerably larger volumes of air or other gaseous material can be treated in a substantially continuous operation thereby to make the process described more available for use in commercial applications where large volumes of gaseous material are to be treated and especially where the amount of contaminant in the air may be as low as 75 p. p. m.

Any organic gas or vapor capable of being adsorbed in conventional beds of activated charcoal can be removed from air or other gaseous medium by the process described. This includes almost any organic compound which can exist at normal temperature in a gaseous or vapor phase. Solvent vapors, whether aliphatic, cyclic or heterocyclic, can be removed. These include alcohols, esters, aldehydes, ketones, ethers and certain organo-metallic compounds and derivatives thereof. The process described can be employed effectively in the removal of organic compounds that produce objectionable odors, such as mercaptans or gaseous or vapor phase decomposition products of animal or vegetable matter; halogenated hydrocarbons, even when the compounds decompose upon regeneration of the adsorbent; hydrides of certain inorganic compounds and metals, including hydrogen sulfide, phosphine and the like. The efficiency of adsorption has to do somewhat inversely with the molecular weight of the particular material in a given class. For example, high boiling organic substances may be more easily adsorbed than some of the lower boiling materials or derivatives.

As the adsorbent material, it is preferred to make use of activated carbonaceous material, as represented by activated charcoal from wood products, activated carbon from coal or petroleum products, or other conventional adsorbent activated carbonaceous material. Although not equivalent, use can be made of activated alumina or silica gel as the finely divided adsorbent material dispersed in the air stream to form the adsorbent layer on the filter fabric. For example, activated alumina has been found effective to remove inorganic gaseous compounds, such as sulphur dioxide and the like. For initial dispersion into the air stream automatically to form the porous adsorbent layer on the ingoing side of the filter fabric, it is desirable to make use of adsorbent material reduced to a fine particle size as to a particle size of minus 200 mesh and preferably to a mesh size in which a substantial amount will be minus 200 and plus 325 mesh.

Referring now to the flow diagram, pictorially represented in Figure 1 of the drawing, the numeral 10 represents a passage in the form of a duct through which the contaminated air or other gaseous medium 12 is advanced to a filtration device, identified by the numeral 14, having a filter fabric through which the contaminated air is passed before exhausting the filtered air into the atmosphere through the outlet 16.

While description hereinafter will be made to a preferred filtration system for use in the practice of this invention, it will be understood that any filtration system in which use is made of a filter fabric through which air is circulated may be employed. For a full description of a filter device of the type represented by the numeral 14, reference may be had to issued Patents No. 2,137,254 and No. 2,143,664 relating to a bag type filter housing for the separation of dust or dirt from air. Briefly described, the filter system comprises a bag house 18 having an inlet plenum chamber 20 on the underside and an outlet plenum chamber 22 on the top side. The inlet plenum chamber is provided with an inlet 24 in the side wall in communication with the duct 10 and the outlet plenum chamber is provided with an outlet 16 for exhausting the filtered air into the atmosphere. The top wall of the inlet plenum chamber 20 is provided with a plurality of spaced apart passages 26 for communicating the inlet plenum chamber with the open end in the bottom of a plurality fo filter tubes 28 vertically suspended from hanger rods 30. Means are provided for removal of the bags from the rods for replacement and means 32 are also provided for transverse movement of the rods to shake the tubes thereby to loosen the spent adsorbent material held onto the ingoing side of the filter fabric by the air passing therethrough. The filter tubes 28 are generally formed of a filter fabric, such as of a textile material woven of natural fibers such as cotton and the like but, in the preferred practice, especially under operations at elevated temperatures or in the processing of air contaminated with corrosive vapors, it is desirable to make use of a fabric woven of synthetic fibers, such as synthetic polymeric fibers, glass fibers and the like.

The bottom wall 33 of the inlet plenum chamber is in the form of an open structure or grating which permits the solid particles loosened from the walls of the filter tubes by shaking to fall gravitationally downwardly through the inlet plenum chamber into the underlying hopper 34. The dry particulate substances collected in the hopper can be removed through a door provided in the hopper or automatic means for removal may be provided.

Recovery of the spent adsorbent may be effected by reactivating means conventional with similar adsorbents used in reactor beds for packed towers. For example, the particulate substance may be reactivated by steam or by heat to drive off the adsorbed vapors and to reactivate the adsorbent particles for re-use in the system. In the event that the adsorbent vapors are of economic value or of strategic importance, recovery means in combination with reactivation may be employed such, for example, as in the use of a scrubber in combination with a reactivator to remove the vapors released from the adsorbent material or by the use of reactors to take up the vapors released from the adsorbent. Such reactivation can be carried out with the adsorbent present as a layer on the filter fabric to provide a substantially continuous process or it may be effected while the spent adsorbent is removed for treatment separate and apart from the filter.

In the practice of this invention, the particulate adsorbent material 36 can be introduced through the inlet 38 into the air stream 12 passing through the duct 10 into the bag house 18. The finely divided adsorbent material 36 becomes uniformly dispersed in relatively high concentrations in the air. In the inlet plenum chamber 20, the air stream will become substantially uniformly divided for flow of equivalent amounts through the openings 26 into each of the filter tubes 28. As the air filters through the fabric 40 of the filter tubes 28, the finely divided adsorbent material 36 separates from the air to form a porous layer 42 of relatively uniform thickness as the lining on the inner walls of each of the tubes. Ordinarily an amount of finely divided adsorbent material will be introduced which is calculated to form a layer having a depth ranging from ⅛ to ¼ inch. As the adsorbent material in the layer becomes saturated, additional increments of finely divided adsorbent material can be introduced periodically into the air stream to add to the layer but it is undesirable to make additions which will build up the layer to a thickness which will offer resistance to air flow sufficient to cause a noticeable pressure drop across the composite layer.

While the air stream is advanced through the bag house, the porous layer 42 of adsorbent particles will be held rather securely to the walls of the tubes in position to be engaged by the contaminating vapors present in the air to remove the vapors from the air by adsorption. The formed porous layer of particulate adsorbent can be removed, as by agitating the bags 28 to prepare the bags for renewal of the porous layer with a fresh batch of adsorbent material. Change-over to remove the material collected on the surface and the build-up of a fresh layer can be effected in less than about 30 seconds with most systems and an amount of particulate adsorbent can be provided in the porous layer for continuous operation over a period of time which may range from 5 to 60 minutes, depending upon the amount of contaminating vapors in the air, thereby to enable substantially continuous operation. Instead, the adsorbent can be removed by reversing the flow of air through the tubes. In the alternative, the adsorbent may be regenerated on the tubes. Ordinarily less than all of the tubes will be on stream at any one time thereby to enable preparation of one group for use while the stream is circulated through another group of tubes. For this purpose, the bank of tubes are compartmentalized for enabling the described substantially continuous operation with a single filter unit.

While experience will dictate the amount of particulate substance introduced to build up the porous layer on the filter fabric, it is expedient to calculate for the introduction of an amount of particulate substance which will be more than the amount capable of being saturated by the amount of contaminating vapors present in the air to be adsorbed and preferably an amount which is from ten to forty times greater than the theoretical amount capable of being saturated by the amount of vapors adsorbed from the air. The relationship between the amount of particulate adsorbent, the amount of vapors to be adsorbed from the air and the volume of air to be treated per unit time will dictate the operating cycle. In order to protect against break through, it is preferred to have a safety factor by the use of twice the amount of particulate substance or one-half the length of the theoretical cycle. One hundred percent adsorption efficiency can be made readily available by the use of ten to forty times the theoretical amount of activated carbon.

The finely divided adsorbent material spread uniformly to provide the thin porous layer on the filter fabric offers very little resistance to air flow through the composite layers by comparison with packed towers. As a result, the system described can be employed in the treatment of large volumes of air for removal of contaminating vapors present in dilute concentrations without the power requirements which would otherwise be required for packed towers and which would make packed towers impractical for use under equivalent conditions.

The finely divided adsorbent material provides such a tremendous amount of surface area available for adsorption that the particulate adsorbent can be present in a thin porous layer and still effect vapor removal as efficiently and as completely as the less flexible and more expensive systems of packed adsorbent towers and with much more efficient utilization of adsorbent.

It will be apparent from the foregoing that I have provided a new and improved system and apparatus for the removal or recovery of vapors, especially organic vapors, present as a contaminant in air or other gaseous medium even when present in concentrations as low as 75 p. p. m. or as high as 50,000 p. p. m. The described process is free of any of the objectionable characteristics of the static adsorption towers which have heretofore been employed. The process described is capable of use in substantially continuous operation for the removal or recovery of vapors from air issuing constantly and at a relatively uniform rate from devices and reactors employed in the process industries.

It will be understood that changes may be made in the details of construction, arrangement and operation without departing from the spirit of the invention, especially as defined in the following claims.

I claim:

1. The method of removing contaminating vapors from gaseous medium comprising the steps of building up a porous layer of a finely divided adsorbent material on the ingoing surface of a filter fabric, advancing the contaminated gaseous medium through the porous layer of adsorbent material on the filter fabric to hold the finely divided adsorbent onto the fabric and to bring the contaminating vapors into intimate contacting relationship with the particulate substance for the removal of vapors from the gaseous stream, removing the layer of spent adsorbent from the surface of the layer of the filter fabric prior to saturation of the particulate substance with the contaminating vapors, and then replacing the removed layer with active adsorbent for subsequent treatment of the contaminated gaseous medium flowing therethrough.

2. The method of removing organic vapors present as a contaminant in air comprising the steps of building up a porous layer of a finely divided adsorbent material on the ingoing surface of a filter fabric, advancing the contaminated air through the porous layer of adsorbent material on the filter fabric to hold the finely divided adsorbent onto the fabric and to bring the contaminating vapors into intimate contacting relationship with the particulate substance for the removal of vapors from the air, removing the layer of spent adsorbent from the surface of the layer of the filter fabric prior to saturation of the particulate substance with the contaminating vapors, and then replacing the removed layer with active adsorbent for subsequent treatment of the contaminated air flowing therethrough.

3. The method as claimed in claim 1 in which the particulate adsorbent material is built up on the ingoing side of the filter fabric by introducing the adsorbent material in a high concentration in an initial portion of the contaminated gaseous stream caused to pass through the filter fabric.

4. The method as claimed in claim 1 in which the spent adsorbent present as a layer on the surface of the filter fabric is removed by stopping the flow of gaseous medium therethrough and then shaking down the filter fabric to displace the adsorbent material from the surface thereof.

5. The method as claimed in claim 4 in which the adsorbent material is introduced in high concentrations in spaced apart intervals into the gaseous medium contaminated with the vapors to build up separate increments of adsorbent material onto the surfaces of the filter fabric to form a composite contact layer.

6. The method as claimed in claim 5 in which the porous layer of adsorbent material is built up in thickness on the filter fabric until an excessive pressure drop is secured during passage of the gaseous medium thereacross.

7. The method as claimed in claim 1 in which the adsorbent comprises activated carbonaceous material having a particle size of minus 200 mesh.

8. The method as claimed in claim 1 in which the layer of adsorbent material built up on the filter fabric has a thickness less than ½ inch in cross section.

9. The method of removing contaminating vapors from gaseous medium comprising the steps of building up a porous layer of a finely divided adsorbent material on the ingoing surface of a filter fabric, advancing the contaminated gaseous medium through the porous layer of adsorbent material onto the filter fabric to hold the finely divided adsorbent onto the fabric and to bring the contaminating vapors into intimate contacting relationship with the particulate adsorbent for the removal of vapors from the gaseous stream, regenerating the adsorbent when substantial saturation by vapors takes place to unsaturate the adsorbent for continued use as the adsorbent material through which the contaminated gaseous stream is advanced.

10. The method of removing contaminating vapors from gaseous medium comprising the steps of building up a porous layer of a finely divided adsorbent material on the ingoing side of a filter fabric, advancing the contaminated gaseous medium through the porous layer of adsorbent material to bring the contaminating vapors into intimate contacting relationship with the particulate adsorbent for the removal of vapors form the gaseous stream by adsortpion, reversing the flow of gaseous medium through the filter fabric periodically to remove the spent adsorbent from the surface of the fabric, and then replacing the removed layer of adsorbent material with active adsorbent for subsequent treatment of the contaminated gaseous medium flowing therethrough.

11. The method as claimed in claim 1 in which only a portion of the filter elements are employed for vapor removal while others in a system are subject to regeneration whereby a continuous operation is effected for removal of contaminating vapors from the gaseous stream.

References Cited in the file of this patent

UNITED STATES PATENTS

| | | |
|---|---|---|
| 1,366,655 | Haslup | Jan. 25, 1921 |
| 2,492,401 | Schutte | Dec. 27, 1949 |
| 2,747,681 | Schuftan et al. | May 29, 1956 |
| 2,778,715 | Austin | Jan. 22, 1957 |